United States Patent
Scroggins et al.

(10) Patent No.: US 11,268,694 B2
(45) Date of Patent: Mar. 8, 2022

(54) MOTOR CONTROLLER FOR DRAFT INDUCER MOTOR IN A FURNACE AND METHOD OF USE

(71) Applicant: Regal Beloit America, Inc., Beloit, WI (US)

(72) Inventors: Devan Scroggins, Cassville, MO (US); Paul Steven Mullin, Yellow Springs, OH (US)

(73) Assignee: Regal Beloit America, Inc., Beloit, WI (US)

( * ) Notice: Subject to any disclaimer, the term of this patent is extended or adjusted under 35 U.S.C. 154(b) by 0 days.

(21) Appl. No.: 16/037,543

(22) Filed: Jul. 17, 2018

(65) Prior Publication Data

US 2020/0025374 A1 Jan. 23, 2020

(51) Int. Cl.
*F23N 3/08* (2006.01)
*F23N 5/18* (2006.01)
*H02K 11/00* (2016.01)

(52) U.S. Cl.
CPC ............ *F23N 3/085* (2013.01); *F23N 5/184* (2013.01); *H02K 11/0094* (2013.01); *F23N 2225/06* (2020.01); *F23N 2227/02* (2020.01); *F23N 2233/04* (2020.01); *F23N 2237/02* (2020.01)

(58) Field of Classification Search
CPC ... F23N 3/085; F23N 2025/06; F23N 2033/04
See application file for complete search history.

(56) References Cited

U.S. PATENT DOCUMENTS

| | | | |
|---|---|---|---|
| 5,616,995 A * | 4/1997 | Hollenbeck | F23N 1/062 318/432 |
| 8,764,435 B2 | 7/2014 | Nordberg et al. | |
| 8,842,000 B2 * | 9/2014 | Day | F24F 11/0079 159/37 |
| 9,093,885 B2 | 7/2015 | Song | |
| 9,261,277 B2 | 2/2016 | Hugghins et al. | |
| 2008/0127962 A1 * | 6/2008 | Thompson | F23N 5/184 126/116 A |
| 2008/0127963 A1 | 6/2008 | Thompson | |
| 2009/0261767 A1 * | 10/2009 | Butler | F04D 27/004 318/445 |
| 2009/0324427 A1 * | 12/2009 | Tolbert, Jr. | F04B 39/0207 417/13 |
| 2014/0030662 A1 * | 1/2014 | Noman | F24H 3/087 431/12 |
| 2015/0118631 A1 * | 4/2015 | Roy | F27B 17/00 432/29 |
| 2016/0116179 A1 * | 4/2016 | Land, III | F24F 11/30 700/276 |
| 2017/0350595 A1 * | 12/2017 | Kowald | F23N 3/082 |
| 2018/0087775 A1 | 3/2018 | Mullin et al. | |
| 2019/0020247 A1 * | 1/2019 | Shahi | H02K 11/27 |

* cited by examiner

*Primary Examiner* — Jason Lau
(74) *Attorney, Agent, or Firm* — Armstrong Teasdale LLP

(57) ABSTRACT

A motor controller for a draft inducer motor that operates an inducer blower in a furnace is provided. The motor controller includes a communication interface operable to receive a signal from a system controller. The signal represents a command to operate the draft inducer motor. The motor controller includes a processor operable to operate the draft inducer motor in accordance with a predefined motor speed profile during at least one of an ignition stage and a combustion stage of the furnace.

20 Claims, 3 Drawing Sheets

MOTOR CONTROLLER FOR DRAFT INDUCER MOTOR IN A FURNACE AND METHOD OF USE

BACKGROUND

The field of the disclosure relates generally to airflow in furnaces, and more specifically to a motor controller for a draft inducer motor in a furnace.

New regulations limit emission of dangerous combustion gas by-products, such as $NO_x$, in gas-burning appliance applications, for example, furnaces used in heating, ventilation, and air conditioning (HVAC) systems. To reduce emissions to comply with such regulations, some manufacturers have implemented burner design changes to provide higher flow rates and pressure of combustion gasses, which are required during a burning stage of the furnace to meet the new standards for efficiency and low by-product emissions. The higher flow rate and pressure causes draft inducers to have to run at much higher speeds. However, at the speeds required for steady state combustion, successful and reliable ignition of the burners is difficult due to increased turbulence at the burners. Further, the ignition process generates excessive amounts of noise that may cause discomfort to people nearby.

One known solution to achieve reliable ignition, while also meeting the increased efficiency standards, is to use variable speed blowers. However, use of variable speed blowers requires advanced controllers capable of generating and outputting pulse-width-modulation (PWM) signals to control the variable speed motors. The need for such advanced controllers poses an increased cost to manufacturers to switch from standard low cost control systems to significantly more expensive advanced control systems.

Another known solution includes using a two-speed control method, where a system controller commands the draft inducer to operate at a low speed setting for ignition and a high speed setting for steady-state combustion speed. However, these two-speed control methods require the addition of external relays for each speed setting to the system control board. Adding external relays increases cost and spacing requirements associated with the system control board. Additionally, the two-speed methods are limited to the two speed settings and offer little flexibility in adjusting motor speed points.

BRIEF DESCRIPTION

In one aspect, a motor controller for a draft inducer motor that operates an inducer blower in a furnace is provided. The motor controller includes a communication interface operable to receive a signal from a system controller. The signal represents a command to operate the draft inducer motor. The motor controller includes a processor operable to operate the draft inducer motor in accordance with a predefined motor speed profile during at least one of an ignition stage and a combustion stage of the furnace.

In another aspect, a method of controlling a draft inducer motor that operates an inducer blower in a furnace is provided. The method includes receiving, by a communication interface of a motor controller, a signal from a system controller, the signal representing a command to operate the draft inducer motor. The method also includes operating, by a processor of the motor controller, the draft inducer motor in accordance with a predefined motor speed profile during at least one of an ignition stage and a combustion stage of the furnace.

In yet another aspect, a furnace is provided that includes an inducer blower, a draft inducer motor coupled to and operable to drive the inducer blower, and a motor controller. The motor controller includes a communication interface operable to receive a signal representing a command to operate the draft inducer motor, and a processor operable to operate the draft inducer motor in accordance with a predefined motor speed profile during at least one of an ignition stage and a combustion stage of the furnace.

DETAILED DESCRIPTION

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

Gas furnaces burn a mixture of air and a fuel to generate heat that is carried by combustion gasses. The combustion gasses are typically drawn through a heat exchanger by a blower, and then vented out through an exhaust duct. To meet increasingly stringent efficiency and by-product emissions standards, manufacturers have implemented burner design changes to provide higher flow rates and pressure of the combustion gasses. However, these burner design changes have also added significant airflow restriction in the burners, resulting in the draft inducers running at much higher speeds. The higher speeds induce higher rates of airflow. If the airflow is too great, ignition of the combustion gasses becomes difficult and unreliable. Motor controllers described herein interface with standard, low-cost system controllers to receive an operation command signal, and regulate motor speed for the blower during an ignition phase to generate low airflow to improve ignition reliability, and regulate motor speed for the blower after the ignition phase to generate higher airflow and to provide a high-quality burn with low by-product emissions.

Figure 1:
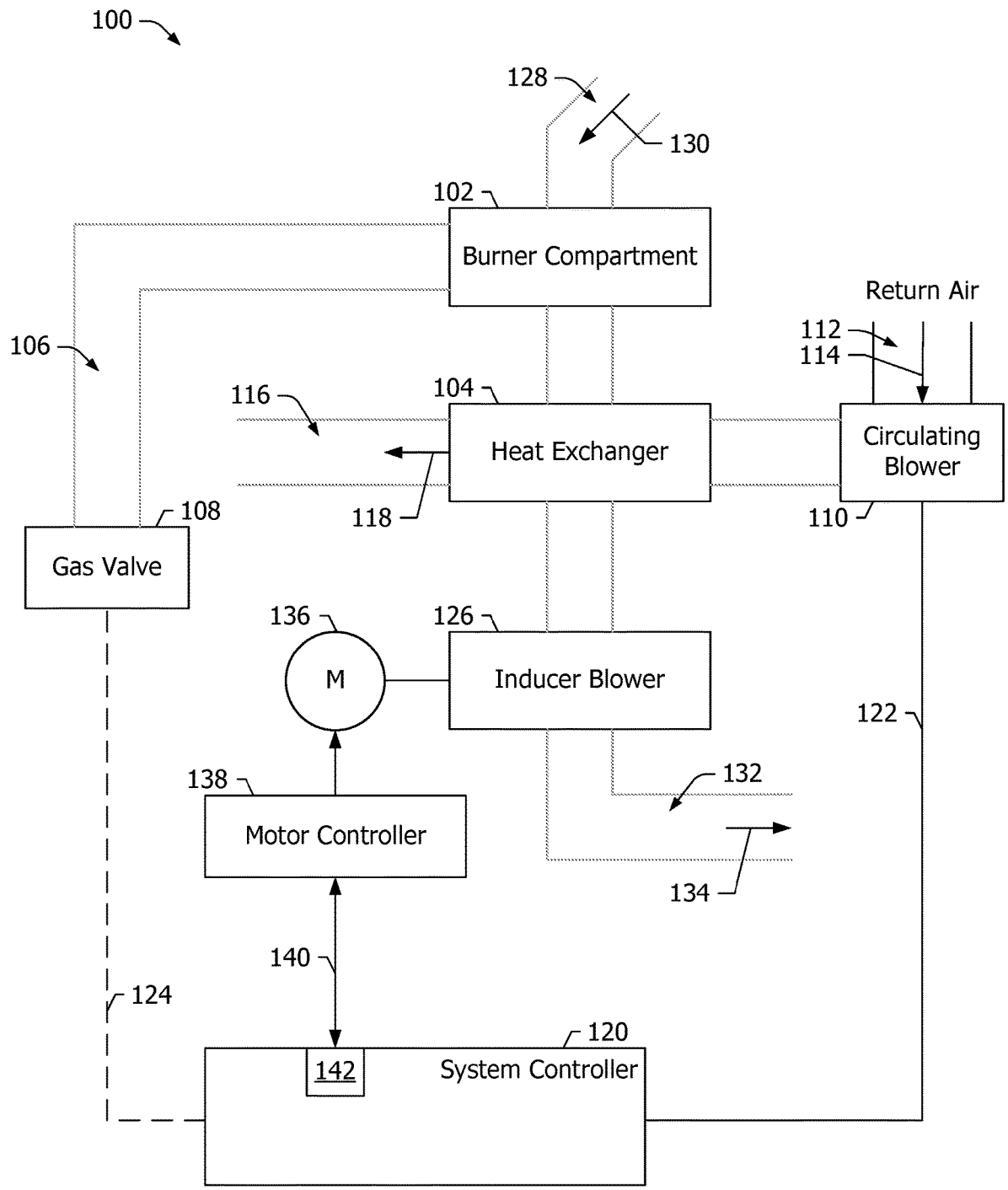
FIG. 1 is a schematic view of an exemplary furnace.

FIG. 1 is a schematic view of an exemplary furnace 100. The primary components of furnace 100 include a burner compartment 102 and a heat exchanger 104. A gas valve 168 that may be electrically or pneumatically regulated, provides fuel such as natural gas or propane, from a source (not illustrated) to burner compartment 102 via a gas line 106. Burner compartment 102 burns the fuel provided by gas valve 108, and provides heated combustion gasses to heat exchanger 104. The heated combustion gasses pass through heat exchanger 104, and are ultimately exhausted to the exterior of the building or home in which furnace 100 is installed.

In the illustrative furnace, a circulating blower 110 accepts return air from return ductwork 112 of a building or home as indicated by arrow 114 and blows the return air through heat exchanger 104, thereby heating the return air. The heated air exits heat exchanger 104 and is provided back into the building or home via conditioned air ductwork 116, traveling in a direction indicated by arrow 118.

Furnace 100 includes a system controller 120 operable to control various components of furnace 100, including the ignition of fuel by an ignition element (not shown), the operation of gas valve 108, and the speed and operation times of circulating blower 110. In addition, system controller 120 may further be configured to monitor and/or control various other aspects of the system including any damper and/or diverter valves connected to the supply air ducts, any sensors used for detecting temperature and/or airflow, any sensors used for detecting filter capacity, and any shut-off valves used for shutting off the supply of gas to gas valve 108. In the control of other gas-fired appliances such as water heaters, for example, system controller 120 may also be tasked to perform other functions such as water level and/or temperature detection, as desired. In some embodiments, system controller 120 is further operable to communicate with one or more thermostats or the like (not shown) for receiving calls for heat, sometimes from various locations within the building or structure. It should be understood, however, that system controller 120 may be configured to provide connectivity to a wide variety of platforms and/or standards, as desired. System controller 120 may provide commands to circulating blower 110 via an electrical line 122. In some instances, system controller 120 may electrically control gas valve 108 by transmitting command signals via an optional electrical line 124.

Furnace 100 includes an inducer blower 126 positioned downstream of heat exchanger 104 that draws combustion gases through heat exchanger 104. Inducer blower 126 may be considered as pulling combustion air into burner compartment 102 through an inlet duct 128 to provide an oxygen source for supporting combustion within burner compartment 102. The combustion air moves in a direction indicated by arrow 130. Combustion gasses, which may include $NO_x$ gasses, pass through heat exchanger 104, and ultimately are exhausted through an exhaust duct 132 in a direction indicated by arrow 134. Although inducer blower 126 is shown as being positioned proximate exhaust duct 132, it is contemplated, in alternative embodiments, that inducer blower 126 may be positioned anywhere between inlet duct 128 and exhaust duct 132. For example, inducer blower 126 may be located upstream of burner compartment 102 to push air through burner compartment 102, rather than downstream to pull air through burner compartment 102, as is shown in FIG. 1.

Furnace 100 includes a draft inducer motor 136 configured to drive inducer blower 126 to generate the airflow 130 into inlet duct 128. In at least some embodiments, draft inducer motor 136 is a variable speed motor configured to convert electrical power into mechanical power. In alternative embodiments, draft inducer motor 136 is a permanent magnet motor. In one example, draft inducer motor 136 is coupled to a wheel (not shown) of inducer blower 126 and is configured to rotate the wheel. In the exemplary embodiment, draft inducer motor 136 is configured to operate at a plurality of speed output levels (i.e., speed-controlled) to increase or decrease a corresponding motor speed. Increasing or decreasing the motor speed of draft inducer motor 136 causes draft inducer motor 136 to drive inducer blower 126 to generate corresponding airflow volumes. The airflow volume generated by inducer blower 126 is at least partially a function of the motor speed of draft inducer motor 136.

A motor controller 138 is communicatively coupled to draft inducer motor 136 to operate draft inducer motor 136. Motor controller 138 controls draft inducer motor 136 by transmitting a control signal representing a variable motor speed. The control signal may be implemented, for example, and without limitation, as a square wave. In certain embodiments, the control signal may undergo pulse width modulation to affect a change in duty cycle that represents a motor speed set-point. More specifically, motor controller 138 supplies current having a certain amplitude and frequency to the stator windings of draft inducer motor 136 to operate draft inducer motor 136. By adjusting the current and frequency, motor controller 138 controls the speed of draft inducer motor 136.

Motor controller 138 is communicatively coupled to system controller 120 and is configured to receive command signals from system controller 120 via an electrical line 140 instructing draft inducer motor 136 whether or not to operate. For example, possible implementations of electrical line 140 may include, but are not limited to, discrete, serial, parallel, analog, and/or digital communications. More specifically, system controller 120 includes an internal relay 142 that, when closed, provides a signal to motor controller 138. The signal may be any type of signal including, but not limited to, a logic level signal, a transistor-transistor logic (TTL) signal, and/or an AC/DC signal. If the signal is an AC/DC signal, it may be either a low-voltage signal (i.e., less than 20 VDC) or a line (high) voltage signal (i.e., at least 60 VAC). Alternatively, there may be no command signal, and a user could switch power to draft inducer motor 136 directly. When motor controller 138 receives the signal from system controller 120, motor controller 138 operates draft inducer motor 136 in accordance with a predefined speed profile that facilitates gas ignition, as described in more detail below. When system controller 120 opens relay 142, the signal is no longer received by motor controller 138, and motor controller 138 stops operation of draft inducer motor 136.

Figure 2:
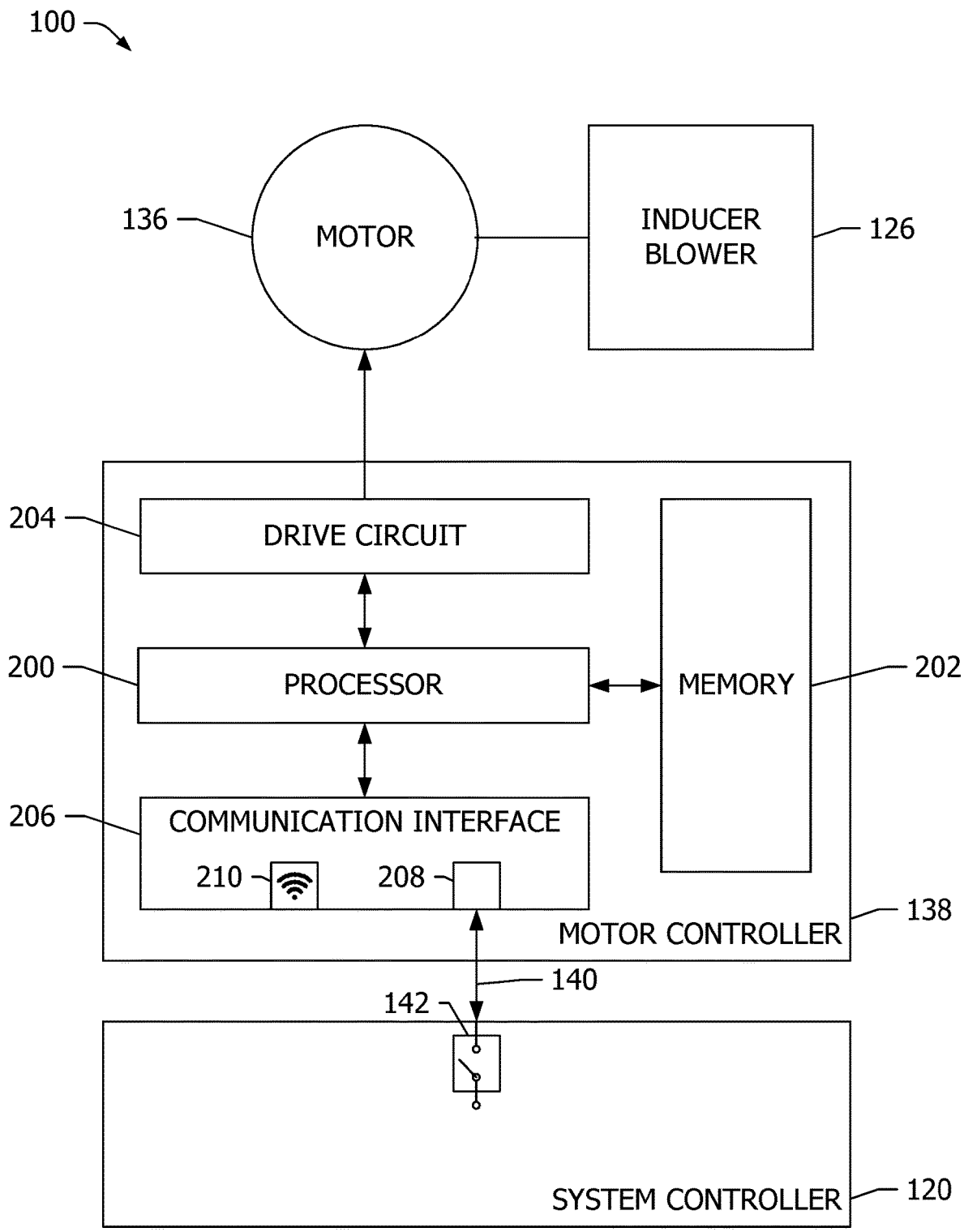
FIG. 2 is a detailed block diagram of a motor controller for use in the furnace shown in FIG. 1.

FIG. 2 is a detailed block diagram of motor controller 138 (shown in FIG. 1) used in furnace 100 (shown in FIG. 1). Motor controller 138 includes a processor 200, and a memory 202 communicatively coupled to processor 200. Processor 200 is configured to execute instructions stored within memory 202 to cause motor controller 138 to function as described herein. For example, memory 202 is a non-transitory memory that stores computer-executable instructions and data for operating motor controller 138. In certain embodiments, motor controller 138 is configured to store stores a speed profile in memory 202 to be executed by processor 200 to operate draft inducer motor 136. In some embodiments, motor controller 138 may include a plurality of processors 200 and/or memories 202. In other embodiments, memory 202 may be integrated with processor 200. In one example, memory 202 includes a plurality of data storage devices to store instructions and data as described herein.

Motor controller 138 includes a drive circuit 204. Drive circuit 204 supplies electric power to the stator windings of draft inducer motor 136 based on control signals received from processor 200. Drive circuit 204 may include, for example, various power electronics for conditioning line frequency alternating current (AC) power to be supplied to the stator windings of draft inducer motor 136 with a desired current, i.e., phase and amplitude, and frequency. Such power electronics may include, for example, and without limitation, one or more rectifier stages, power factor correction (PFC) circuits, filters, transient protection circuits, EMF protection circuits, inverters, or power semiconductors.

Motor controller 138 includes a communication interface 206. Communication interface 206 may include one or more wired or wireless interface, such as, for example, universal serial bus (USB), RS232 or other serial bus, CAN bus, Ethernet, near field communication (NFC), WiFi, Bluetooth, or any other suitable interface for establishing one or more communication channels between motor controller 138 and one or more external devices, such as system controller 120, an external programming device, and/or any other device that enables motor controller 138 to function as described herein.

In the exemplary embodiment, communication interface 206 includes an input terminal 208 configured to be electrically coupled to system controller 120, and more specifically, to relay 142, using electrical wire 140 such that wired signals may be transmitted therebetween. For example, wired signals may include, but are not limited to, discrete, serial, parallel, analog, and/or digital communication, and/or any other known types of wired signals. Because motor controller 138 performs all of the speed determination and controlling of draft inducer motor 136 and the only input provided by system controller 120 is a command to start/stop draft inducer motor 136, input terminal 208 is a simplified the interface between motor controller 138 and system controller 120, as compared to known interfaces. That is, input terminal 208 provides a connection for motor controller 138 to relay 142, a standard component on most furnace system control boards. Thus, in some embodiments, draft inducer motor 136 with motor controller 138 may be used as a drop-in replacement for standard induction motors without having to change or upgrade system controller 120. More specifically, system controller 120 does not provide speed control signals to motor controller 138. More specifically, system controller 120 provides neither discrete signals using multiple relays, each associated with a respective speed, nor PWM signals generated by system controller 120. Conversely, using multiple relays increases costs and spacing requirements on system controller 120, and provide inflexible control of motor speed. Using PWM signals requires advanced system controls, which are significantly more expensive than standard controls and require the use of a variable speed motor, adding even more costs.

In the exemplary embodiment, communication interface 206 includes a wireless module 210 configured to receive and/or transmit wireless signals from/to external devices. For example, wireless signals may include, but are not limited to, Bluetooth, Bluetooth low energy, near field communications (NFC), infrared, and/or any other known types of wireless signals. In the exemplary embodiment, the motor speed profile is wirelessly programmed into a configurable portion of memory 202 either while on the assembly line during manufacturing or while packaged for shipment. The parameters of the motor speed profile are provided to a programming computer device that wirelessly transmits the motor speed profile to motor controller 138. The signal including the motor speed profile is received by wireless module 210 and is stored on memory 202. Once draft inducer motor 136 and motor controller 138 are installed in furnace 100 and motor controller 138 receives a command signal from system controller 120 to operate, processor 200 retrieves the motor speed profile from memory 202 and applies it to control operation of draft inducer motor 136.

Figure 3:
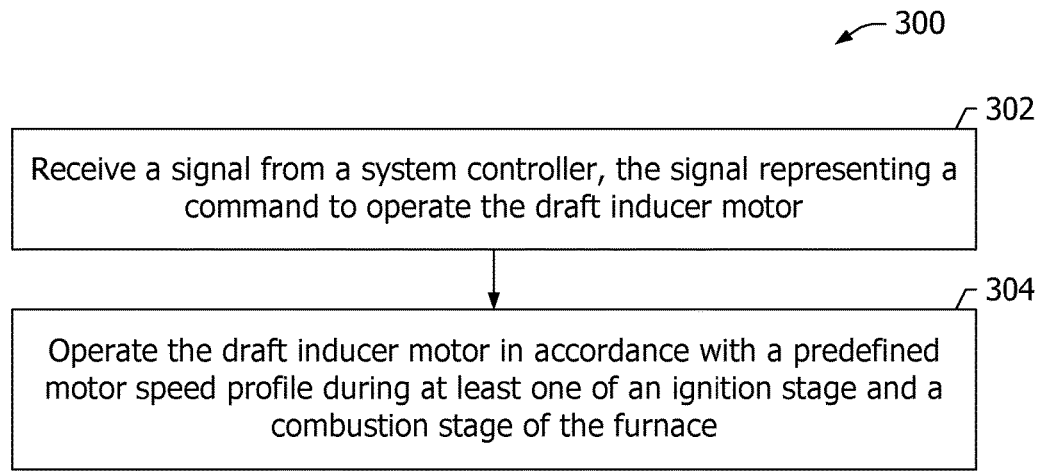
FIG. 3 is a flow diagram of an exemplary method of controlling an inducer blower in the furnace shown in FIGS. 1 and 2.
Figure 4:
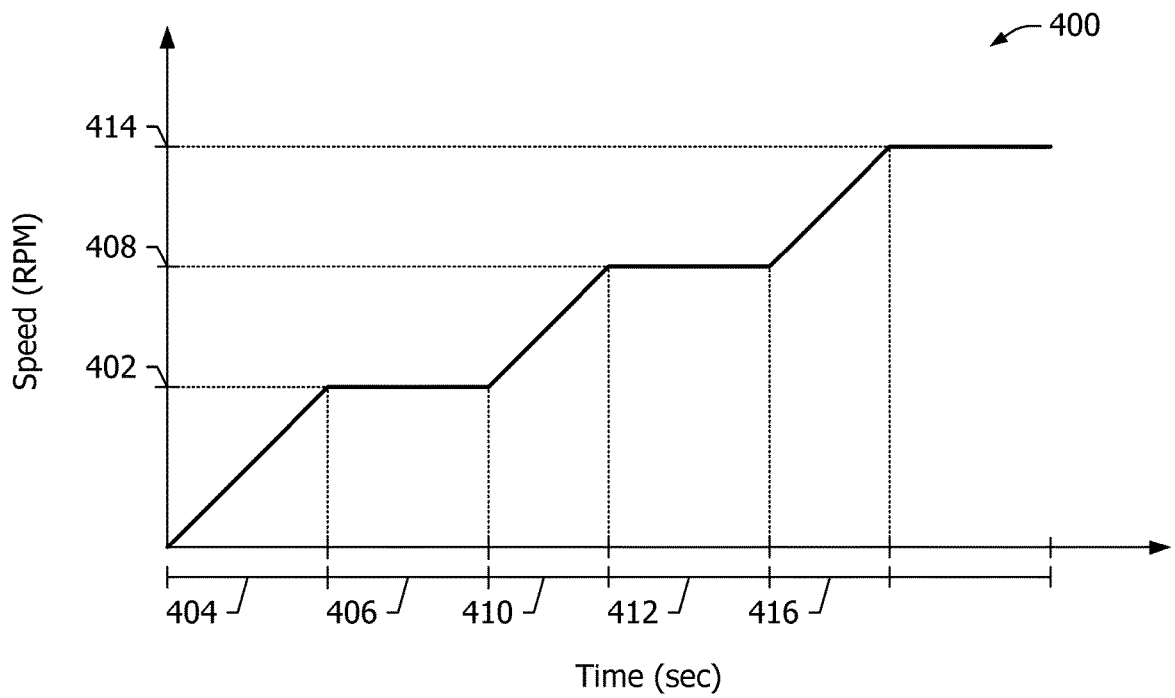
FIG. 4 is a graph showing an exemplary motor speed profile that may be implemented by the motor controller shown in FIGS. 1 and 2.

FIG. 3 is a flow diagram of an exemplary method 300 of controlling inducer blower 126 in furnace 100 (shown in FIGS. 1 and 2). FIG. 4 is a graph showing an exemplary motor speed profile 400 that may be implemented by motor controller 138 (shown in FIGS. 1 and 2). At a receiving step 302, motor controller 138 receives a signal from system controller 120 via electrical line 140. The signal represents a command from system controller 120 to operate draft inducer motor 136. Upon receiving the signal, at an operating step 304, motor controller 138 operates draft inducer motor 136 in accordance with a stored motor speed profile during at least one of an ignition stage and a combustion stage of the furnace. The stored motor speed profile facilitates automatic ramping speed control and timing of draft inducer motor 136 to achieve more reliable and less noisy gas ignition.

In some embodiments, operating step 304 includes motor controller 138 ramping a speed of draft inducer motor 136 up to a first (or ignition) motor speed 402 over a first time period 404 to cause inducer blower 126 to generate airflow 130 through inlet duct 128. Motor controller 138 then maintains the speed of draft inducer motor 136 at the first motor speed 402 for a second time period 406 during the ignition stage of the furnace. During the second time period 406, while draft inducer motor 136 is operating inducer blower 126 to generate airflow 130, system controller 120 controls gas flow into burner compartment 102. Ignition of the burners should occur within burner compartment 102 during the second time period. For example, the second time period may be 90 seconds or any other desired time period. The value of the first motor speed may vary depending on the size of the furnace in which draft inducer motor 136 is installed, as the speed needed to achieve a reliable ignition varies depending on furnace size. The first motor speed is significantly lower than a steady-state combustion speed at which draft inducer motor 136 is designed to operate during normal operation of furnace 100. Accordingly, the first speed may be, for example, within a range of 1,000-3,000 RPM, depending on furnace size. Alternatively, any other first speed may be used that enables furnace 100 to function as described herein.

In optional embodiments, upon completion of the second time period 406, motor controller 138 ramps a speed of draft inducer motor 136 up to a second (or intermediate) motor speed 408 over a third time period 410. After the third time period 410, motor controller 138 maintains the speed of draft inducer motor 136 at the second motor speed 408 to enable burner stabilization, if desired. In such embodiments, the second motor speed 408 may be an intermediate speed between the light-off speed and the steady-state combustion speed. For example, the second motor speed 408 may be within a range of 2,500-4,500 RPM. The intermediate speed enables the burners in furnace 100 to stabilize for periods longer than would be feasible using ramp rates. This may be desired because as the burners are ramped up, relatively hotter and cooler spots are developed, and the stabilization period allows the temperature differences to be reduced before ramping up to steady-state operation. Motor controller 138 maintains the speed of draft inducer motor 136 at the second motor speed 408 for a fourth time period 412.

Upon completion of the fourth time period 412, motor controller 138 ramps a speed of draft inducer motor 136 up to a third (steady-state combustion) motor speed 414 over a fifth time period 416. After the fifth time period 416, motor controller 138 maintains the speed of draft inducer motor 136 at the third motor speed 414 during the combustion stage of the furnace. In such embodiments, the third motor speed 414 is the final steady-state combustion speed that corresponds to an airflow at which furnace 100 is designed to operate. For example, the third motor speed 414 may be within a range of 4,000-6,000 RPM. Motor controller 138 powers off draft inducer motor 136 when the signal is no longer received from system controller 120.

Motor controllers described herein control a draft inducer motor to operate an inducer blower to generate low airflow to improve ignition reliability during an ignition phase and to achieve high-efficiency combustion and heat exchange with low by-product emissions after the ignition phase. Embodiments of the motor controller described herein provide a simple interface with standard, low-cost system controllers to receive an operation command signal. Upon receiving the operation command signal, motor controllers described herein operate the draft inducer motor in accordance with a predefined motor speed profile to control the airflow to a reasonable level depending on the phase of operation of the furnace.

The methods and systems described herein may be implemented using computer programming or engineering techniques including computer software, firmware, hardware or any combination or subset thereof, wherein the technical effect may include at least one of: (a) operating an inducer blower for a furnace at a variable speed; (b) controlling airflow through a furnace based on a phase of operation of the furnace; (c) improving ignition reliability of the burners by controlling the draft inducer motor to generate a low airflow during an ignition phase; (d) improving efficiency of combustion and heat transfer in the furnace, while achieving low by-product emissions; and (e) simplifying the interface to be operable with standard, low-cost system controllers.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the terms processor, processing device, and controller.

In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only, and are thus not limiting as to the types of memory usable for storage of a computer program.

The systems and methods described herein are not limited to the specific embodiments described herein, but rather, components of the systems and/or steps of the methods may be utilized independently and separately from other components and/or steps described herein.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A motor controller for a draft inducer motor that operates an inducer blower in a furnace, said motor controller comprising:
    a memory configured to store a predefined motor speed profile, wherein the predefined motor speed profile defines a first ramping time period comprising a first stored duration, an ignition stage time period comprising a second stored duration, a first motor speed for the ignition stage time period, a second ramping time period comprising a third stored duration, and a second motor speed for a combustion stage, and wherein a value of the first motor speed is determined based on a size of the furnace;
    a communication interface operable to receive a signal from a system controller, the signal representing a command to operate the draft inducer motor; and
    a processor operable to operate the draft inducer motor in accordance with the predefined motor speed profile during at least one of 1) the first ramping time period and the ignition stage time period, and 2) the second ramping time period and the combustion stage of the furnace.

2. The motor controller of claim 1, wherein said communication interface comprises an input terminal configured to be coupled to a relay of the system controller, said input terminal operable to receive the signal from the system controller.

3. The motor controller of claim 2, wherein said input terminal is operable to receive at least one of a discrete signal, a serial signal, a parallel signal, an analog signal, and a digital communication signal.

4. The motor controller of claim 1, wherein said processor, in operating the draft inducer motor in accordance with the predefined motor speed profile, is further operable to:
    ramp a speed of the draft inducer motor up to the first motor speed over a first ramping time period to cause the inducer blower to generate airflow through an inlet duct of the furnace;
    maintain the speed of the draft inducer motor at the first motor speed for a second time period, the second time period representing the ignition stage time period, during the ignition stage of the furnace;

ramp a speed of the draft inducer motor up to the second motor speed over a third time period, the third time period representing the second ramping time period, upon completion of the second time period; and maintain the speed of the draft inducer motor at the second motor speed upon completion of the third time period during the combustion stage of the furnace.

5. The motor controller of claim 4, wherein the first motor speed is lower than a steady-state combustion speed, wherein the first motor speed is a speed at which the draft inducer motor operates to facilitate gas ignition in a burner compartment of the furnace.

6. A motor controller for a draft inducer motor that operates an inducer blower in a furnace, said motor controller comprising:
a memory configured to store a predefined motor speed profile, wherein the predefined motor speed profile defines a first ramping time period, an ignition stage time period, a first motor speed for the ignition stage time period, and a second ramping time period, and a second motor speed for a combustion stage, and wherein a value of the first motor speed is determined based on a size of the furnace;
a communication interface operable to receive a signal from a system controller, the signal representing a command to operate the draft inducer motor; and
a processor operable to operate the draft inducer motor in accordance with the predefined motor speed profile during at least one of 1) the first ramping time period and the ignition stage time period, and 2) the second ramping time period and the combustion stage of the furnace.

7. The motor controller of claim 6, wherein the value of the first motor speed is within a range of 1,000-3,000 revolutions per minute (RPM).

8. The motor controller of claim 4, wherein the second motor speed is a steady-state combustion speed that corresponds to an airflow at which the furnace is designed to operate.

9. The motor controller of claim 8, wherein the value of the second motor speed is within a range of 4,000-6,000 RPM.

10. The motor controller of claim 1, wherein said processor is further operable to power off the draft inducer motor when the signal is no longer received from the system controller.

11. The motor controller of claim 1, wherein said communication interface comprises a wireless module configured to receive wireless programming signals from an external programming computer device.

12. The motor controller of claim 11, wherein the wireless programming signals include the predefined motor speed profile.

13. The motor controller of claim 12, wherein the predefined motor speed profile is programmed into the memory while the draft inducer motor is on an assembly line during manufacture or while the draft inducer motor is packaged for shipment.

14. The motor controller of claim 11, wherein the wireless programming signals are at least one of Bluetooth signals, Bluetooth low energy signals, near field communications (NFC) signals, and infrared signals.

15. A method of controlling a draft inducer motor that operates an inducer blower in a furnace, said method comprising:
storing, in a memory, a predefined motor speed profile, wherein the predefined motor speed profile defines a first ramping time period comprising a first stored duration, an ignition stage time period comprising a second stored duration, a first motor speed for the ignition stage time period, a second ramping time period comprising a third stored duration, and a second motor speed for a combustion stage, and wherein a value of the first motor speed is determined based on a size of the furnace;
receiving, by a communication interface of a motor controller a signal from a system controller, the signal representing a command to operate the draft inducer motor; and
operating, by a processor of the motor controller, the draft inducer motor in accordance with the predefined motor speed profile during at least one of 1) the first ramping time period and the ignition stage time period, and 2) the second ramping time period and the combustion stage of the furnace.

16. The method of claim 15, further comprising:
coupling an input terminal of the communication interface to a relay of the system controller; and
receiving, by the input terminal, the signal from the system controller, wherein the signal includes at least one of a discrete signal, a serial signal, a parallel signal, an analog signal, and a digital communication signal.

17. The method of claim 15, wherein operating the draft inducer motor in accordance with the predefined motor speed profile, further comprises:
ramping, by the processor, a speed of the draft inducer motor up to the first motor speed over a first ramping time period to cause the inducer blower to generate airflow through an inlet duct of the furnace;
maintaining, by the processor, the speed of the draft inducer motor at the first motor speed for a second time period, the second time period representing the ignition stage time period, during the ignition stage of the furnace;
ramping, by the processor, a speed of the draft inducer motor up to the second motor speed over a third time period, the third time period representing the second ramping time period, upon completion of the second time period; and
maintaining, by the processor, the speed of the draft inducer motor at the second motor speed upon completion of the third time period during the combustion stage of the furnace.

18. A furnace comprising:
an inducer blower;
a draft inducer motor coupled to said inducer blower and operable to drive said inducer blower to generate an airflow; and
a motor controller comprising:
a memory configured to store a predefined motor speed profile, wherein the predefined motor speed profile defines a first ramping time period comprising a first stored duration, an ignition stage time period comprising a second stored duration, a first motor speed for the ignition stage time period, a second ramping time period comprising a third stored duration, and a second motor speed for a combustion stage, and wherein a value of the first motor speed is determined based on a size of the furnace;
a communication interface operable to receive a signal representing a command to operate the draft inducer motor; and
a processor operable to operate said draft inducer motor in accordance with the predefined motor speed profile during at least one of 1) the first ramping time period and the ignition stage time period, and 2) the second ramping time period and the combustion stage of the furnace.

19. The furnace of claim 18, further comprising a system controller including a relay, wherein said system controller closes said relay to transmit the signal to said motor controller.

20. The furnace of claim 19, wherein said communication interface comprises an input terminal configured to be coupled to said relay of said system controller, said input terminal operable to receive the signal from said system controller.

\* \* \* \* \*